United States Patent
Radhakrishnan et al.

(10) Patent No.: US 8,412,191 B2
(45) Date of Patent: Apr. 2, 2013

(54) CELLULAR TELEPHONE SERVICE MANAGEMENT

(75) Inventors: Dhinakar Radhakrishnan, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 785 days.

(21) Appl. No.: 11/239,926

(22) Filed: Sep. 29, 2005

(65) Prior Publication Data

US 2007/0072607 A1    Mar. 29, 2007

(51) Int. Cl.
    H04W 4/00    (2009.01)
(52) U.S. Cl. ............ 455/435.1; 455/418; 455/419; 455/456.1; 455/417; 455/420
(58) Field of Classification Search .......... 455/418, 455/419, 435.1, 456.1, 417, 420
    See application file for complete search history.

(56) References Cited

U.S. PATENT DOCUMENTS

| | | | |
|---|---|---|---|
| 5,636,140 A * | 6/1997 | Lee et al. ............... 370/469 |
| 6,375,073 B1 | 4/2002 | Aebi et al. |
| 6,397,290 B1 | 5/2002 | Williams et al. |
| 6,473,500 B1 | 10/2002 | Risafi et al. |
| 6,697,422 B1 * | 2/2004 | Mathai .................. 375/222 |
| 6,704,563 B1 | 3/2004 | Senn et al. |
| 6,782,253 B1 * | 8/2004 | Shteyn et al. ........... 455/414.1 |
| 6,912,382 B2 * | 6/2005 | Fellenstein et al. ....... 455/405 |
| 6,934,529 B2 | 8/2005 | Bagoren et al. |
| 6,974,076 B1 | 12/2005 | Siegel |
| 7,333,810 B2 | 2/2008 | Preiss et al. |
| 2001/0005683 A1 | 6/2001 | Zicker et al. |
| 2001/0005783 A1 * | 6/2001 | Hassett ................. 604/523 |
| 2002/0016169 A1 * | 2/2002 | Sykes et al. ............ 455/435 |
| 2002/0072376 A1 * | 6/2002 | Carlsson et al. ......... 455/456 |
| 2003/0002632 A1 | 1/2003 | Bhogal et al. |
| 2003/0027549 A1 | 2/2003 | Kiel et al. |
| 2003/0169865 A1 | 9/2003 | Oren |

(Continued)

FOREIGN PATENT DOCUMENTS

| | | |
|---|---|---|
| CN | 1459207 A | 11/2003 |
| EP | 1 035 741 A2 | 9/2000 |

(Continued)

OTHER PUBLICATIONS

WO 01/86985 A (Nokia Corp) Nov. 15, 2001.*

(Continued)

*Primary Examiner* — Justin Lee
(74) *Attorney, Agent, or Firm* — Florin C. Corie (57) ABSTRACT

A system and method are provided for the management of user terminal (UT) cellular network services. The method includes: registering a UT in a cellular telephone network; accessing a management server; receiving UT-specific management instructions for cellular network services; and, requesting cellular network services for the UT in response to the UT-specific management instructions. In one aspect, the management server is embedded in the UT. Alternately, the management server is accessed via the cellular network. The UT-specific management instructions can be uploaded in a message received via a common control channel, such as Short Message Service (SMS) message or a paging channel message. As another alternative, the management server can be accessed via a UT Broadband subsystem with a hardwire management server interface, or a Wireless Local Area Network (WLAN) subsystem with a wireless management server interface, such as WiFi, Bluetooth, IEEE 802.11, or IEEE 802.15.

37 Claims, 8 Drawing Sheets

U.S. PATENT DOCUMENTS

| | | | |
|---|---|---|---|
| 2005/0003821 A1* | 1/2005 | Sylvain | 455/444 |
| 2005/0105704 A1 | 5/2005 | Harrison et al. | |
| 2006/0079243 A1* | 4/2006 | Bates et al. | 455/456.1 |
| 2007/0072584 A1 | 3/2007 | Jain et al. | |
| 2007/0117558 A1* | 5/2007 | Balwani | 455/421 |
| 2007/0167164 A1* | 7/2007 | Kirla | 455/436 |

FOREIGN PATENT DOCUMENTS

| | | |
|---|---|---|
| EP | 1035741 A2 * | 9/2000 |
| EP | 1150482 | 10/2001 |
| EP | 1249995 | 10/2002 |
| EP | 1253771 A1 | 10/2002 |
| JP | 2000312386 A | 11/2000 |
| JP | 2001500644 T | 1/2001 |
| JP | 2001309445 A | 11/2001 |
| JP | 2002183626 A | 6/2002 |
| JP | 2002527964 T | 8/2002 |
| JP | 2002252729 A | 9/2002 |
| JP | 2002290540 A | 10/2002 |
| JP | 2004501546 T | 1/2004 |
| JP | 2004505341 T | 2/2004 |
| JP | 2005021358 A | 1/2005 |
| KR | 20020062578 | 7/2002 |
| KR | 20020076354 A | 10/2002 |
| KR | 20020093142 | 12/2002 |
| WO | WO0021316 A2 | 4/2000 |
| WO | 01/86985 A1 | 11/2001 |
| WO | WO0208863 A2 | 1/2002 |
| WO | WO2004105300 | 12/2004 |
| WO | WO2005031544 A2 | 4/2005 |
| WO | WO2005062657 A1 | 7/2005 |

OTHER PUBLICATIONS

International Search Report. PCT/US2006/038532, International Searching Authority, European Patent Office, Feb. 8, 2007.

Written Opinion, PCT/US2006/038532, International Searching Authority, European Patent Office, Feb. 8, 2007.

International Preliminary Report on Patentability, PCT/US2006/038532, The International Bureau of WIPO, Geneva, Switzerland, Apr. 1, 2008.

Taiwanese Search report—095134097—TIPO—May 13, 2010.

* cited by examiner

CELLULAR TELEPHONE SERVICE MANAGEMENT

REFERENCE TO CO-PENDING APPLICATIONS FOR PATENT

The present Application for Patent is related to the following co-pending U.S. patent application Ser. No. 11/240,075 "CELLULAR TELEPHONE CREDIT MANAGEMENT", filed concurrently herewith, assigned to the assignee hereof, and expressly incorporated by reference herein.

BACKGROUND

1. Field

The invention generally relates to cellular telephone communications and, more particularly, to a system and method for managing the cellular network services for a cellular network user terminal (UT).

2. Background

A wireless cellular telephone user terminal (UT) may be put into service for a customer through a service provider, which may a different entity than a network provider, i.e., the entity providing the wireless communications infrastructure. The activation process may requires that once the service provider determines that the customer should be authorized for service, the service provider contacts the network provider. The services offered to the UT customer may be based upon user-provided information and the type of services requested. Some of this information may be distributed to the network provider, along with a unique address to identify the UT.

If a UT customer wishes to modify their account options, user and operator exchange of account and device information, UT address, and the like, the changes are typically communicated via fax, voice call, or email, where they are entered by a customer service representative. Such a process is not only costly and time consuming, but may also result in errors. Further, changes to some account management features are either not offered, or not encouraged.

The end result is that once a customer establishes an account, it is unlikely that the customer will make account modifications, even if the customer's needs change. Alternately, the number and kinds of account modifications that are offered to a customer are limited.

It would be advantageous if a customer had greater control over their account options.

It would be advantageous if third-party controls could be created to manage a class of UT accounts.

SUMMARY

The present invention describes a system and method for the improved management of user terminal (UT) cellular telephone network services. Account services and related options for every UT in the network can be stored in a management server. For example, the management server may be accessible via an Internet Protocol (IP) network. A customer-accessible management server has multiple advantages. One, it is easily accessible to a user, for example, using a browser or application embedded with the user's personal computer. Second, the UT account can be managed by a different entity than the person actually using the UT. For example, a parent may manage the account of the UT used by their child.

In an aspect, a method is provided for the management of UT cellular network services. The method comprises: registering a UT in a cellular telephone network; accessing a management server; receiving UT-specific management instructions for cellular network services; and, requesting cellular network services for the UT in response to the UT-specific management instructions.

In an aspect, the management server is embedded in the UT. Alternately, the management server is accessed via the cellular network. For example, an IP network-connected management server can be accessed via the cellular network. Then, the UT-specific management instructions can be uploaded in a message received via a common control channel, such as Short Message Service (SMS) message or a paging channel message. As another alternative, the management server can be accessed via a UT Broadband subsystem with a hardwire management server interface, or a Wireless Local Area Network (WLAN) subsystem with a wireless management server interface, such as WiFi, Bluetooth, IEEE 802.11, or IEEE 802.15.

The above-described account management permits the controlling entity to exercise a number of new controls over a UT being operated by another party, which have never before been available. For example, the controlling entity may add (or subtract) account credits. The controlling entity may set a limit for the duration of calls, the telephone numbers from which calls may be received, or the telephone number to which a call may be directed.

Additional details of the above-described method, a UT with managed cellular network services, and a system for managing cellular network services are provided below.

DETAILED DESCRIPTION

Figure 1:
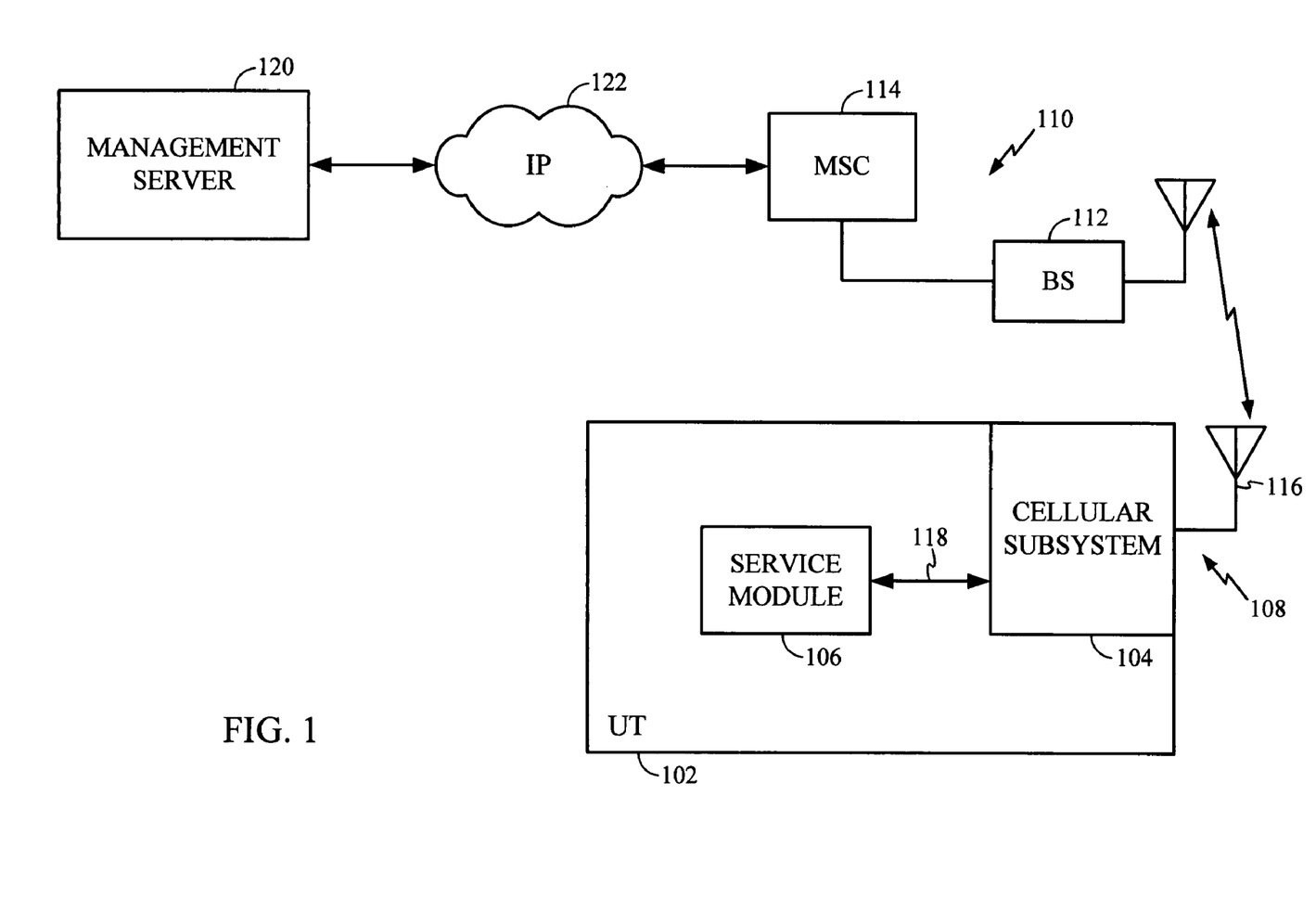
FIG. 1 is a schematic block diagram of a system for managing cellular telephone network user terminal (UT) services.

FIG. 1 is a schematic block diagram of a system for managing cellular telephone network user terminal (UT) services. The system 100 comprises a UT 102, which in turn comprises a cellular subsystem 104 and service module 106. The cellular subsystem has a wireless interface 108 for registering the UT 102 in a cellular telephone network 110, with a Base Station (BS) 112 and a Mobile Switching Center 114. As is understood by those skilled in the art, the wireless interface 108 may include baseband, de/modulation, and transceiver circuitry not shown, along with an antenna 116.

The service module 106 has an interface on line 118 connected to the cellular subsystem 104. The service module 106 requests cellular network services for the UT 102 in response to receiving UT-specific management instructions.

A management server 120 has an Internet Protocol (IP) network interface 122 operatively connected to the UT cellular subsystem 104, via the cellular network 110. The management server 120 supplies the UT-specific management instructions to the UT service module 106.

In the aspect shown in FIG. 1, the management server is accessed via the UT's cellular subsystem 104. In alternate aspects described in more detail below, the UT may have dual modes of operation (not shown). For example, the UT may have a WLAN subsystem, which is used to access the management server 120.

The UT-specific instructions for the management of services can be used to control a variety of account related features and parameters associated with the UT. For example, the management instructions can be used to control UT account credits. In this aspect, a controlling entity can add or subtract from the UT's account balance. For example, this would permit a parent to add a credit into a child's balance. Alternately, a business can top-up an employee's account. In another aspect, an account can be credited by a third party as a reward for a performed service.

The management instructions can be used to control permitted call durations. For example, a parent may limit any call to a maximum length of 20 minutes. Otherwise, duration can be controlled with respect to the time of day the call is made, or the telephone number of the peer user. In another aspect, duration can be cross-referenced to location. For example, only 1-minute calls are permitted while the child UT user is proximate to their school. In another aspect, the duration is responsive to absolute cost, cost per minute, or the remaining account balance.

The management instructions can be used to control permitted originating call numbers. For example, a parent may prohibit or limit calls originating from certain acquaintances of a child, while permitting unlimited access to calls originating from a select list of relatives. Likewise, similar restrictions might be imposed on target call numbers, which are the telephone numbers that the UT user is allowed to call.

The management instructions can be used to control permitted call times. Again using the school-child example, the UT can be controlled to not engage in cellular network calls during classes, while permitting calls to be made between classes and after school.

The management instructions can be used to control permitted call zones. The UT can be instructed not to take or receive calls when in the proximity of a movie theater or church for example.

For UTs with embedded browsers, the management instructions can be used to control the URLs that are accessed. For example, the URLs can be permitted on the basis of specific addresses or general content. Likewise, permitted originating email addresses and permitted target email addresses can be controlled. As with cellular calls limits described above, the time, location, and duration of the emails can also be regulated.

For UTs equipped with memory resources and with high-speed data traffic capabilities, the permitted data services can be controlled using management instructions. For example, control can be exercised over the downloading of browsers, games, music, and text messages. In addition to absolute prohibitions, the control can be more refined, as described above for cellular calls. The types of content downloaded can be controlled on the basis of name (address), theme, time of day, location, cost, or the like.

In another aspect, the management instructions can be used to create predetermined ring modes. For example, a business may select a "company ring tone". Alternately, the company may assign a unique ring tone to be associated with each calling employee, or with each client. In a different aspect, the management instructions may permit a user to select a ring tone from a list of permitted ring options.

The management instructions can likewise be used to create a predetermined screen (liquid crystal display screen). For example, a business may select a "company screen". Alternately, the company may assign a unique screen to be associated with each calling employee (i.e., the employee's picture), or with each client. In a different aspect, the management instructions may permit a user to select a screen from a list of permitted screens.

In another aspect, the management instructions can be used to control telephone number memory saves, as well as other kinds of saved data. For example, a business may use the management instructions to download a list of client telephone number and employee phone numbers. Then, the user can speed-dial a number from the downloaded list. Alternately, a parent may have a list of emergency numbers downloaded to a child's UT. Some examples of management instructions have been provided to illustrate the invention. However, the management instructions are not limited to just these examples.

Figure 2:
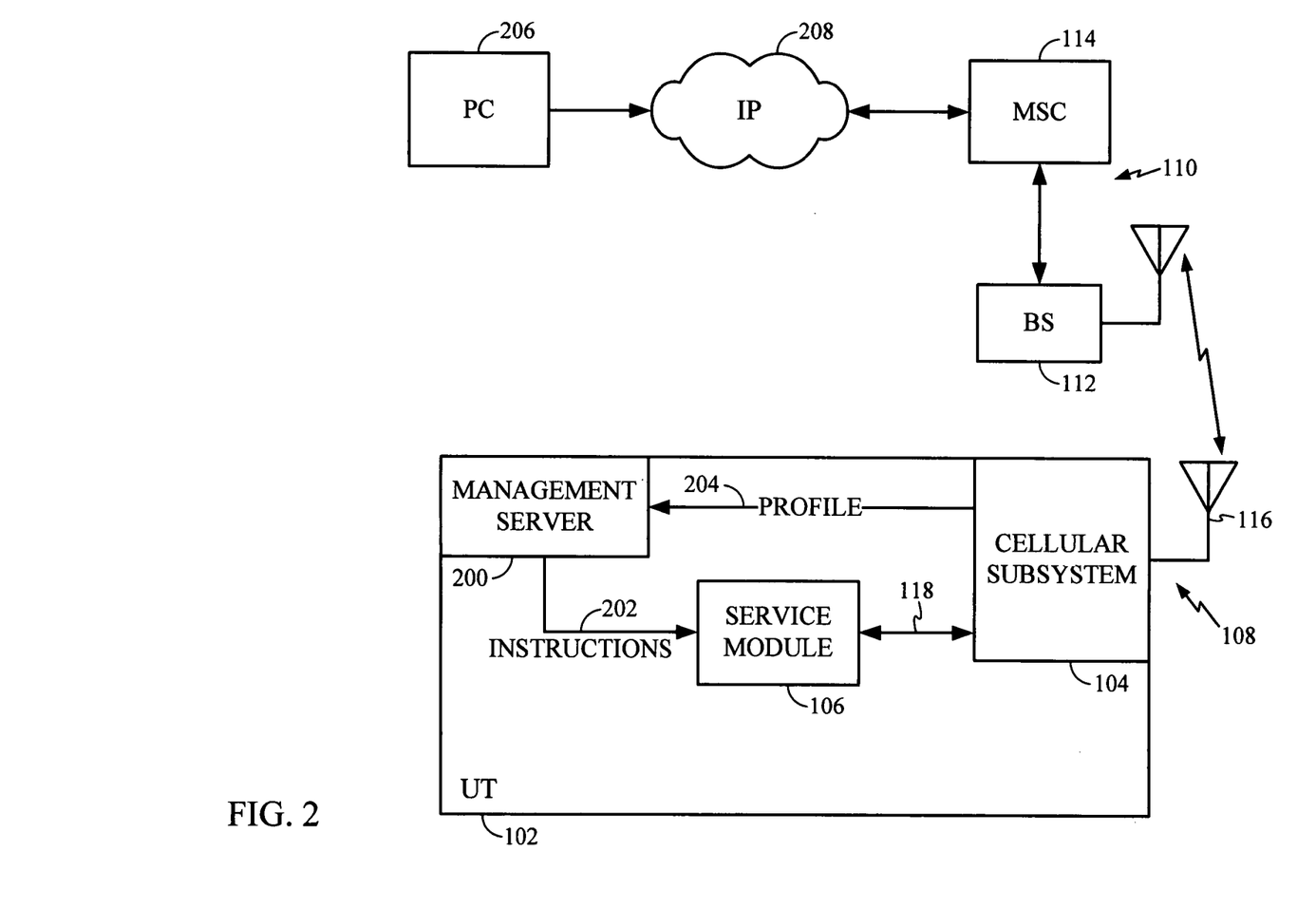
FIG. 2 is a schematic block diagram of a first variation of a UT with managed cellular telephone network services.

FIG. 2 is a schematic block diagram of a first variation of a UT with managed cellular telephone network services. In common with all the other managed service-UTs described below, the UT 102 comprises a cellular subsystem 104 having a wireless interface 108 for registering the UT 102 in a cellular telephone network. The UT 102 also includes a service module 106 having an interface on line 118 connected to the cellular subsystem 104 for requesting UT cellular network services in response to receiving UT-specific management instructions.

Also in common with all the managed service-UTs, the service module 106 has an interface for accessing a management server, and loading the UT-specific management instructions in response to accessing the management server. The UT-embedded management server 200 is shown having an interface on line 202 connected to the service module 106, to supply UT-specific management instructions.

The management server 200 also has an interface 204 to receive a management profile for establishing cellular network service parameters, which involves creating and modifying UT-specific management instructions. For example, the management profile describes the account options that are selected or created by the UT account controlling entity. The profile is loaded into the management server 200, and the management server creates commands that enable the management instructions. In one aspect, the management server 200 includes a microprocessor and memory to execute instructions using a Binary Runtime Environment for Wireless (BREW) application and API connected to a transceiver modem. Alternately, instructions can be carried out using a state machine such as a programmable gate array.

In the aspect shown in FIG. 2, the management profile is delivered via the cellular network wireless interface 108. The UT-embedded management server 200 is connected to the cellular subsystem 104 via line 204, to receive the management profile, and to provide UT-specific management instructions responsive to the management profile. The management profile may originate from a personal computer 206 that is connected to the cellular network 110 via an IP network 208. The cellular network 110 may deliver the management profile to the UT 102 in a control channel communications or in a proprietary data message sent via a traffic channel.

Figure 3:
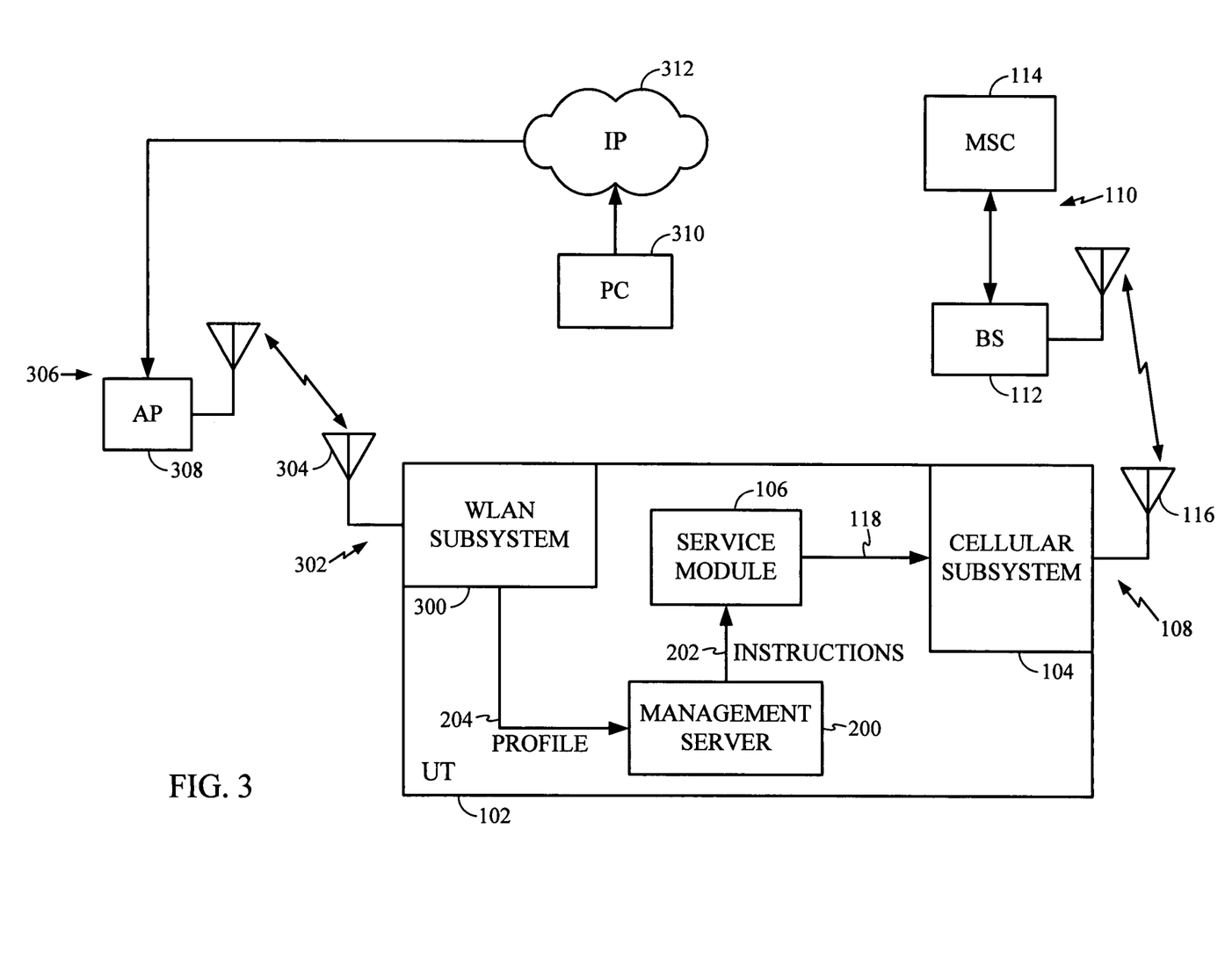
FIG. 3 is a schematic block diagram of a second variation of a UT with managed cellular telephone network services.

FIG. 3 is a schematic block diagram of a second variation of a UT with managed cellular telephone network services. In this aspect, the UT 102 further comprises a Wireless Local Area Network (WLAN) subsystem 300, in addition to the cellular subsystem 104, management server 200, and service module 106. The WLAN subsystem may operate in accordance with Bluetooth, IEEE 802.11, IEEE 802.15, or WiFi protocols. WLANs generally compliant with IEEE 802.15 and Bluetooth permit a UT to communicate with an AP, up to a distance of about 100 feet. WLANs generally compliant with IEEE 802.11 permit the UT the range up to a distance of about 500 feet from an AP.

The WLAN subsystem has a wireless interface 302 to receive a management profile for the UT 102. The WLAN wireless interface 302 typically includes baseband, de/modulation, and transceiver circuitry not shown, along with an antenna 304.

The WLAN subsystem 300 communicates via a WLAN network 306 having an Access Point (AP) 308. The management profile may originate, for example, from a personal computer (PC) 310 connected directly to the WLAN network 306, or as shown, connected to the WLAN network 306 via an IP network interface 312.

The UT-embedded management server 200 has an interface on line 204 that is connected to the WLAN subsystem 300 to receive the management profile. The management server provides UT-specific management instructions responsive to the management profile, which are sent to the service module on line 202.

Figure 4:
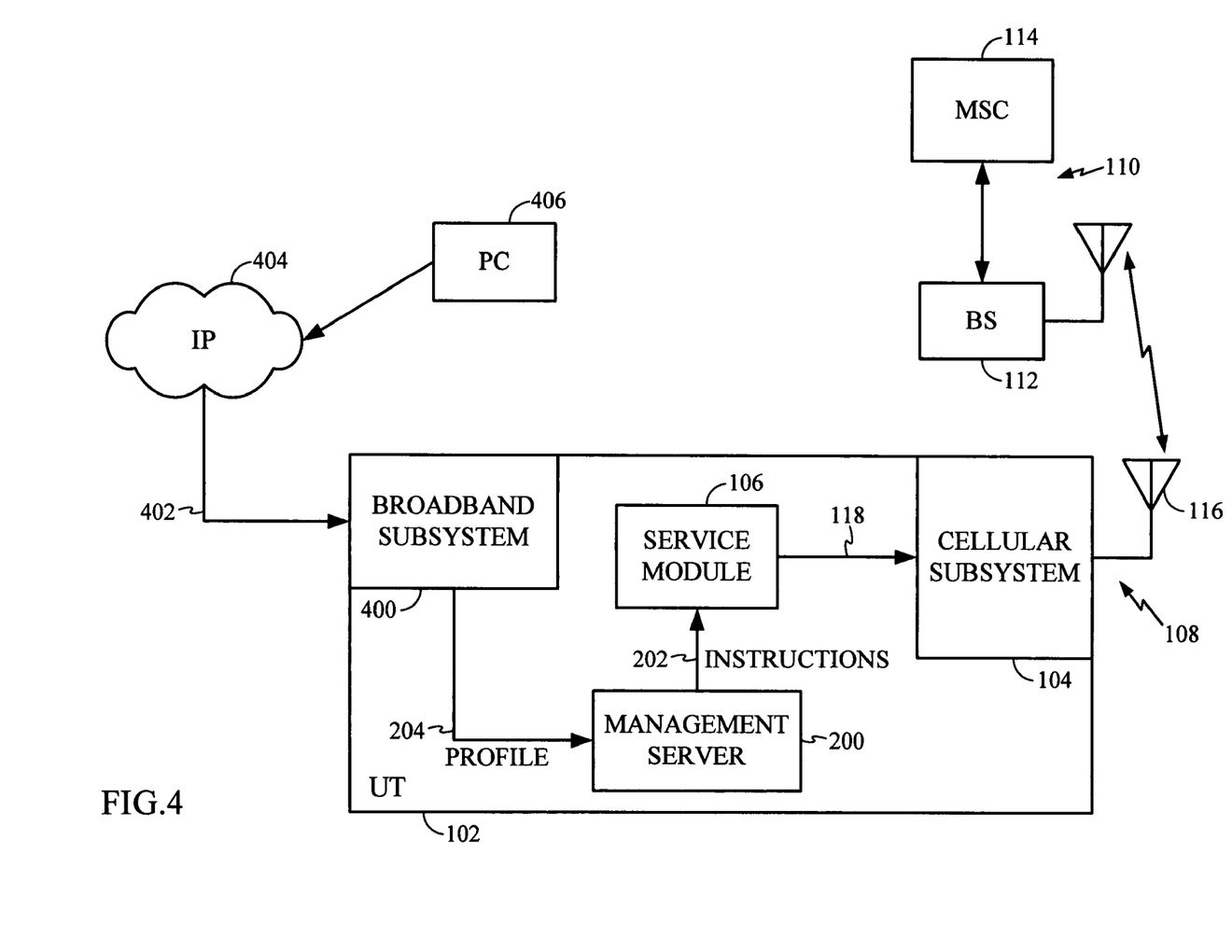
FIG. 4 is a schematic block diagram of a third variation of a UT with managed cellular telephone network services.

FIG. 4 is a schematic block diagram of a third variation of a UT with managed cellular telephone network services. The UT 102 further comprises a Broadband subsystem 400, in addition to the cellular subsystem 104, service module 106, and management server 200. The Broadband subsystem 400 has a hardwire interface on line 402 to receive a management profile for the UT 102.

The UT-embedded management server 200 has an interface connected to the Broadband subsystem 400, on line 204, to receive the management profile. The management server 200 provides UT-specific management instructions responsive to the management profile. The management instructions are provided to the service module 106 on line 202.

The Broadband subsystem 400 communicates via a Broadband network 404, such as an Internet Service Provider (ISP). The management profile may originate, for example, from a personal computer (PC) 406 connected to the Broadband network 404. Alternately but not shown, a management profile may be directly downloaded from a management application on a PC, via a hardwire connection.

Figure 5:
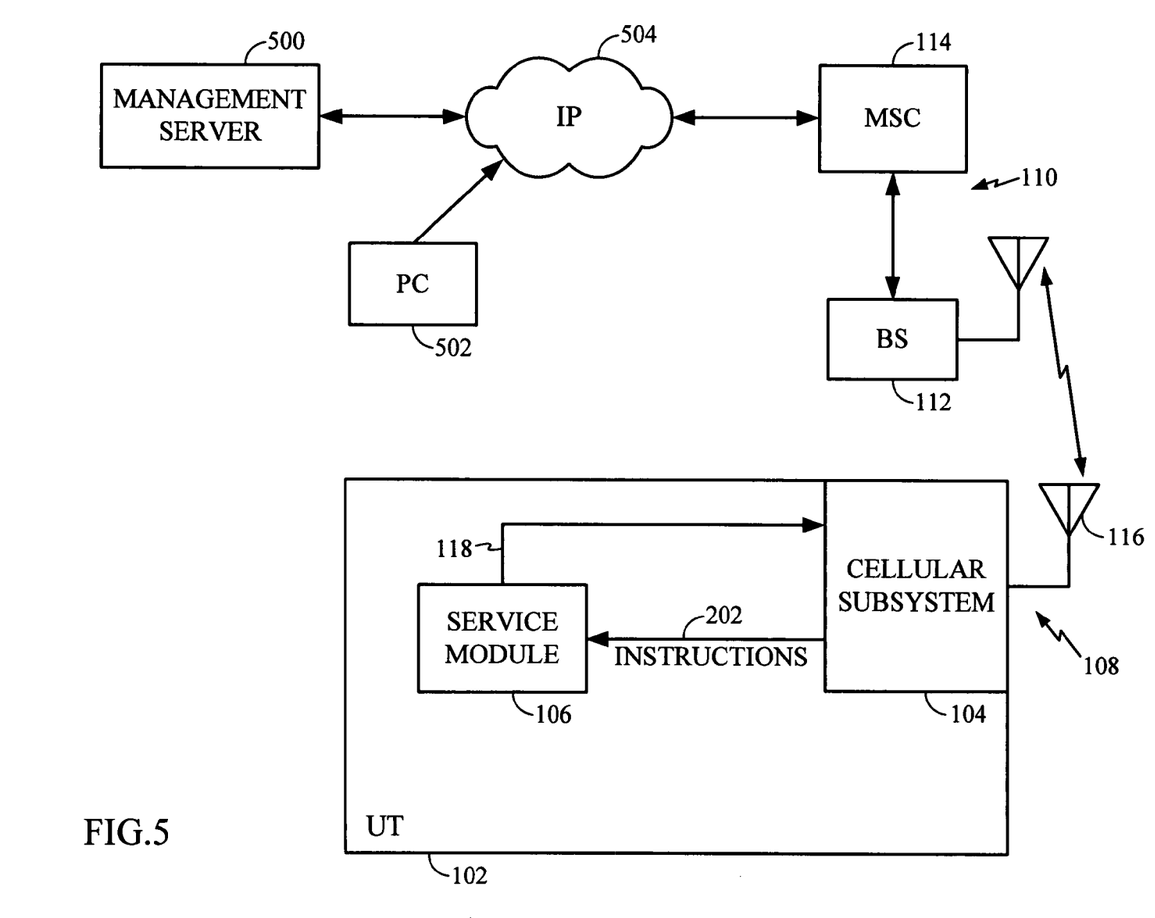
FIG. 5 is a schematic block diagram of a fourth variation of a UT with managed cellular telephone network services.

FIG. 5 is a schematic block diagram of a fourth variation of a UT with managed cellular telephone network services. In this aspect, the management server 500 is remotely located from the UT 102. The service module 106 uses the cellular subsystem 104 to access the management server 500 via the cellular network. As shown, the cellular subsystem 104 accesses an IP network-connected management server 500, via the cellular network 110.

The cellular subsystem 104 uploads the management instructions in a message received via a common control channel such as a Short Message Service (SMS) message and a paging channel message. In one aspect, the service module 106 automatically receives UT-specific management instructions from the management server 500 in response to registering with the cellular network 110.

In this aspect, the management profile can be loaded into the management server, or modified, using a PC 502 that is connected to the management server 500 via the IP network 504.

Figure 6:
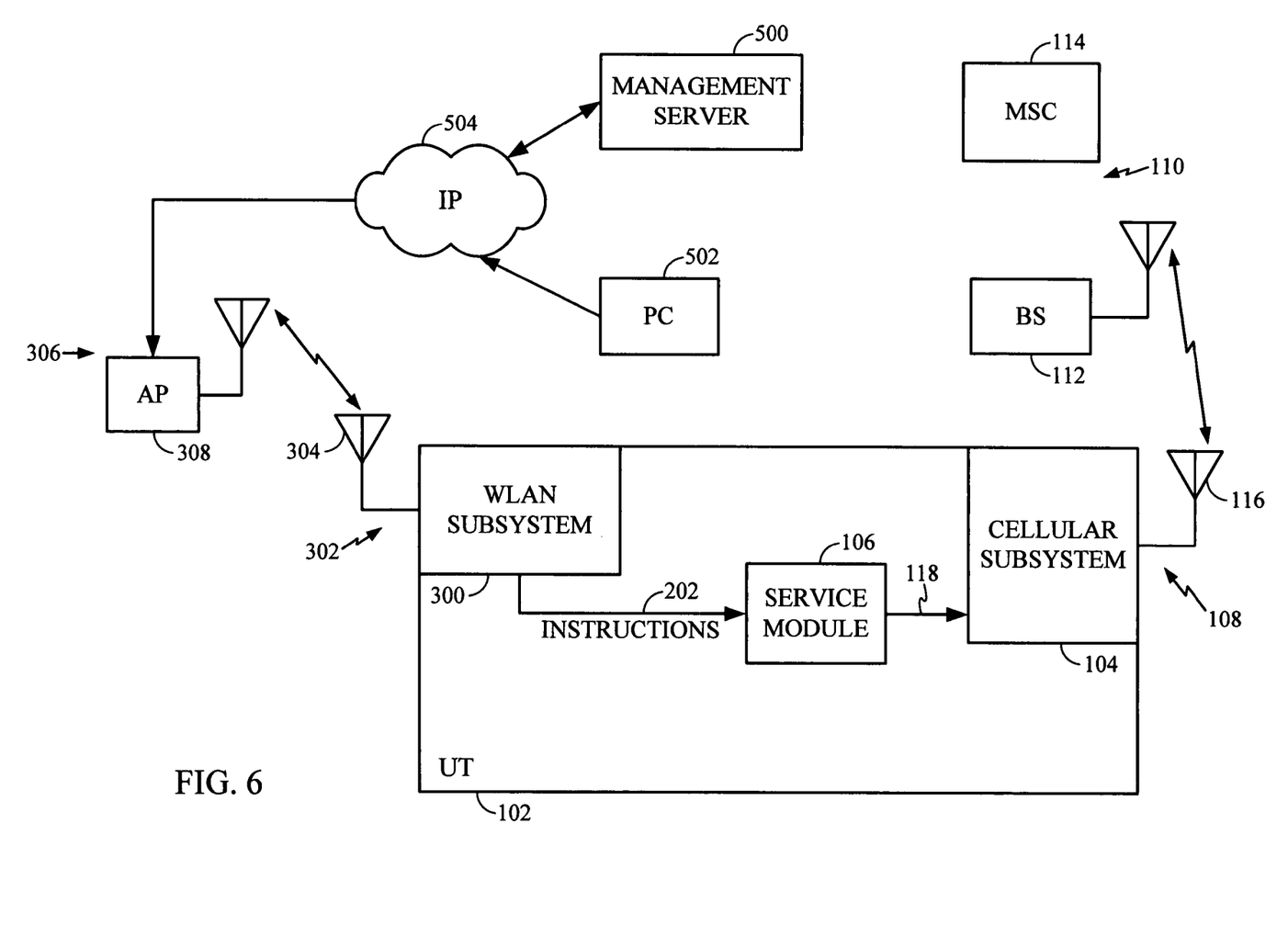
FIG. 6 is a schematic block diagram of a fifth variation of a UT with managed cellular telephone network services.

FIG. 6 is a schematic block diagram of a fifth variation of a UT with managed cellular telephone network services. In this aspect, the management server 500 is remotely located from the UT 102. The service module 106 uses the WLAN subsystem 300 to access the management server 500 via the WLAN network 306. As in FIG. 3, the WLAN subsystem 300 may operate in accordance with IEEE 802.11, 802.15, WiFi, or Bluetooth protocols. As shown, the WLAN subsystem 300 accesses an IP network-connected management server 500, via the WLAN network 306.

In this aspect, the management profile can be loaded into the management server, or modified, using a PC 502 that is connected to the management server 500 via the IP network 504.

Figure 7:
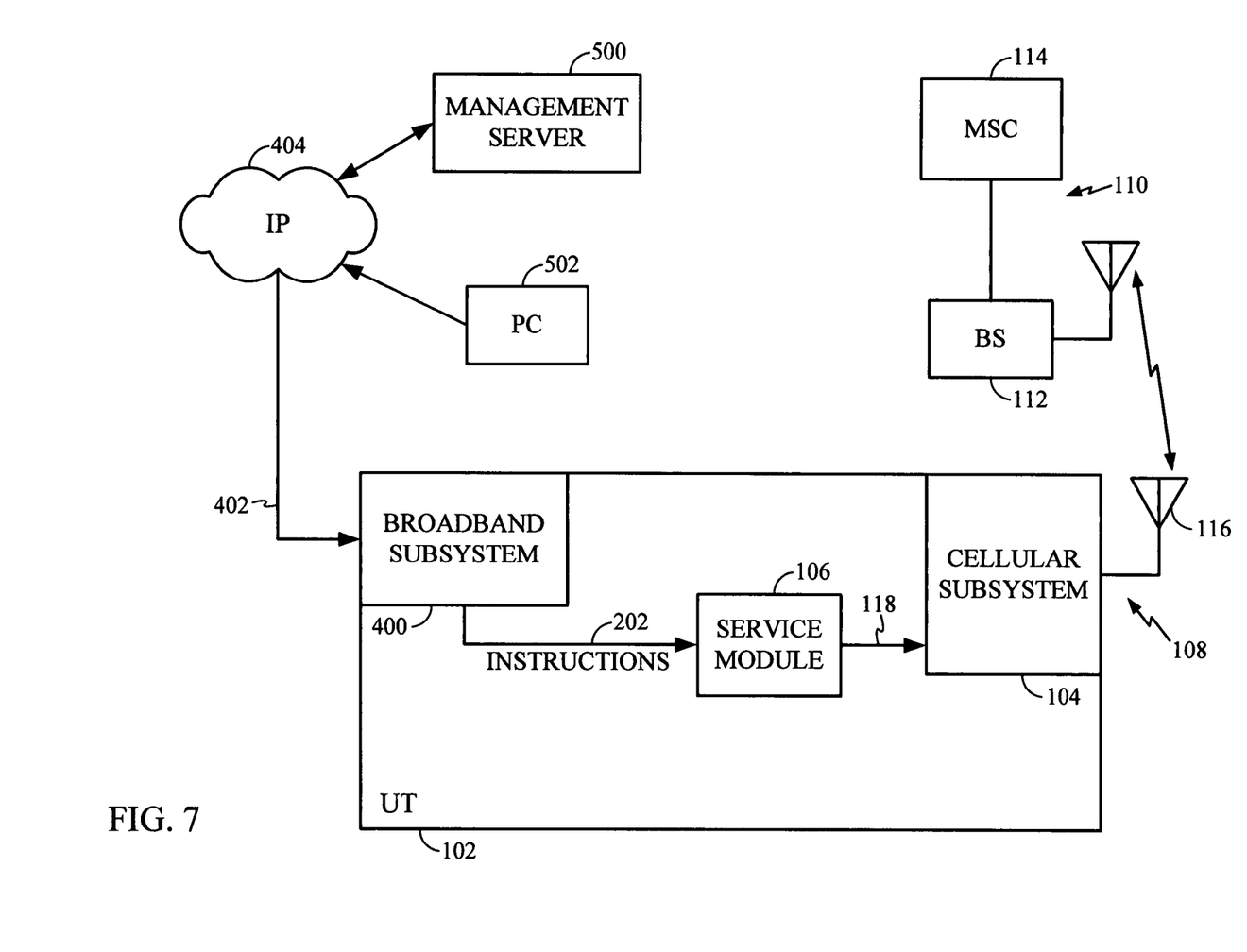
FIG. 7 is a schematic block diagram of a sixth variation of a UT with managed cellular telephone network services.

FIG. 7 is a schematic block diagram of a sixth variation of a UT with managed cellular telephone network services. In this aspect, the management server 500 is remotely located from the UT 102. The service module 106 uses the Broadband subsystem 400 to access the management server 500 via the cellular network. As shown, the cellular subsystem 104 accesses an IP network-connected management server 500, via the Broadband/IP network 404.

In this aspect, the management profile can be loaded into the management server, or modified, using a PC 502 that is connected to the management server 500 via the IP network 404.

Figure 8:
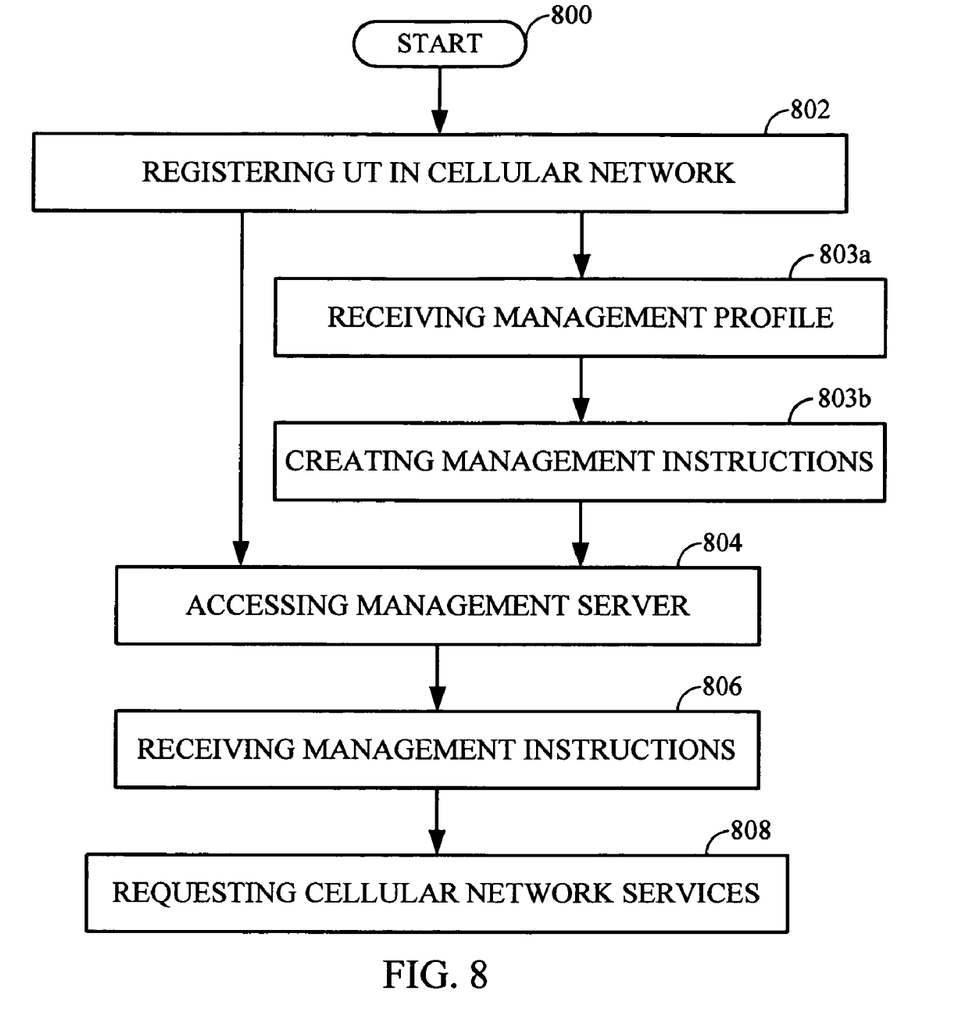
FIG. 8 is a flowchart illustrating a method for managing UT cellular telephone network services.

FIG. 8 is a flowchart illustrating a method for managing UT cellular telephone network services. Although the method is presented as a sequence of steps for clarity, the steps need not necessarily be performed consecutively. The method starts at Step 800.

Step 802 registers a UT in a cellular telephone network. Step 804 accesses a management server. Step 806 receives UT-specific management instructions for cellular network services in response to accessing the management server. Step 808 requests cellular network services for the UT in response to the UT-specific management instructions.

In one aspect, accessing the management server in Step 804 includes accessing a management server embedded in the UT. This aspect may involve further steps. Step 803a receives a management profile for establishing cellular network service parameters via an interface such as a cellular network, WLAN, or Broadband hardwired interface. Step 803b creates the UT-specific management instructions in response to the management profile.

In a different aspect, Step 804 accesses the management server via the cellular network. For example, an IP network-connected management server may be accessed via the cellular network. Receiving the UT-specific management instructions in Step 806 may include uploading the UT-specific management instructions in a message received via a common control channel such as a SMS or paging channel message. In one aspect, Step 806 automatically receives the UT-specific management instructions from the management server in response to registering with the cellular network.

In another aspect, Step 804 accesses the management server via a UT subsystem such as a Broadband subsystem with a hardwire management server interface, or a WLAN subsystem with a wireless management server interface (i.e., WiFi, Bluetooth, IEEE 802.11, or IEEE 802.15).

As described in detail above, Step 806 receives instructions for the management of services such as account credits, permitted call durations, permitted originating call numbers, permitted target call numbers, permitted call times, permitted call zones, permitted URLs, permitted originating email addresses, permitted target email addresses, permitted data services, a predetermined ring mode, permitted ring options, a predetermined screen, permitted screen options, and memory saves.

A system and method for managing UT cellular network services have been provided. Some examples have been provided of the account parameters that can be managed. Some examples have also been provided of means of downloading and modifying the management instructions. However, the invention is not limited to merely these examples. Other variations and embodiments of the invention will occur to those skilled in the art.

What is claimed is:

1. A method for managing user terminal (UT) cellular telephone network services, the method comprising:
   registering a UT in a cellular telephone network;
   receiving, via a traffic channel, a proprietary data message from the cellular telephone network, wherein the proprietary data message contains UT-specific management instructions for cellular network services, wherein the UT-specific management instructions include instructions to control user account credits, instructions to control permitted call zones and call durations associated with the permitted call zones, instructions to control permitted target call numbers and originating call numbers, instructions to control UT's ring mode and ring, options, instructions to control UT's screen options, instructions to control permitted network addresses, instructions to control permitted originating and target email addresses, instructions to control permitted data services, and instructions to control permitted memory saves; and
   requesting cellular network services for the UT in response to the UT-specific management instructions.

2. The method of claim 1 further comprising:
   accessing a management server; and,
   wherein receiving the UT-specific management instructions includes loading the UT- specific management instructions in response to accessing the management server.

3. The method of claim 2 wherein accessing the management server includes accessing a management server embedded in the UT.

4. The method of claim 3 further comprising:
   receiving a management profile for establishing cellular network service parameters via an interface selected from a group comprising a cellular network, a Wireless Local Area Network (WLAN), and a Broadband hardwired interface; and,
   creating the UT-specific management instructions in-response to the management profile.

5. The method of claim 2 wherein accessing the management server includes accessing the management server via the cellular telephone network.

6. The method of claim 5 wherein accessing the management server via the cellular telephone network includes accessing an Internet Protocol (IP) network-connected management server, via the cellular telephone network.

7. The method of claim 2 wherein accessing the management server includes accessing via a UT subsystem selected from a group comprising a Broadband subsystem with a hardwire management server interface, and a Wireless Local Area Network (WLAN) subsystem with a wireless management server interface selected from a group comprising WiFi, Bluetooth, IEEE 802.11, and IEEE 802.15.

8. The method of claim 2 wherein receiving the UT-specific management instructions includes automatically receiving the UT-specific management instructions from the management server in response to registering with the cellular telephone network.

9. The method of claim 1, Wherein receiving the UT-specific management instructions comprises receiving instructions to control permitted call zones based on proximity to a location.

10. The method of claim 1, wherein receiving the UT-specific management instructions comprises receiving instructions to control permitted data services based on a time of day or a location.

11. The method of claim 1, wherein receiving the UT-specific management instructions comprises receiving instructions to control permitted originated email addresses and permitted target email addresses based on a time of day or a location.

12. The method of claim 1, wherein receiving the UT-specific management instructions comprises receiving instructions to control permitted call times.

13. A user terminal (UT) with managed cellular telephone network services, the UT comprising:
   a cellular subsystem having a wireless interface configured to registering the UT in a cellular telephone network; and,
   a service module having an interface connected to the cellular subsystem configured to requesting UT cellular network services in response to receiving, via a traffic channel, a proprietary data message from the cellular telephone network, wherein the proprietary data message contains UT-specific management instructions, and wherein the UT-specific management instructions include instructions to control user account credits, instructions to control permitted call zones and call durations associated with the permitted call zones, instructions to control permitted target call numbers and originating call numbers; instructions to control UT's ring mode and ring options, instructions to control UT's screen options, instructions to control permitted network addresses, instructions to control permitted originating and target email addresses, instructions to control permitted data services, and instructions to control permitted memory saves.

14. The UT of claim 13 wherein the service module hag an interface for accessing a management server, and loading the UT-specific management instructions in response to accessing the management server.

15. The UT of claim 14 further comprising:
   a UT-embedded management server having an interface to receive a management profile for establishing cellular network service parameters, and an interface connected to the service module to supply the UT-specific management instructions responsive to the management profile.

16. The UT of claim 15 wherein the wireless interface receives the management profile; and,
   wherein the UT-embedded management server has an interface connected to the cellular subsystem to receive the management profile, and to provide the UT-specific management instructions responsive to the management profile.

17. The UT of claim 15 further comprising:
   a Wireless Local Area Network (WLAN) subsystem, selected from a group comprising Bluetooth, IEEE 802.1, IEEE 802.15, and WiFi, with an wireless interface to receive the management profile; and,
   wherein the UT-embedded management server has an interface connected to the WLAN subsystem to receive the management profile, and to provide the UT-specific management instructions responsive to the management profile.

18. The UT of claim 15 further comprising:
a broadband subsystem with a hardwire interface to receive the management profile; and,
wherein the UT-embedded management server has an interface connected to the broadband subsystem to receive the management profile, and to provide the UT-specific management instructions responsive to the management profile.

19. The UT of claim 14 wherein the service module uses the cellular subsystem to access the management server via the cellular telephone network.

20. The UT of claim 19 wherein the cellular subsystem accesses an Internet Protocol (IP) network-connected management server, via the cellular telephone network.

21. The UT of claim 14 wherein the service module automatically receives the UT-Specific management instructions from the management server in response to registering with the cellular telephone network.

22. The UT of claim 14 further comprising:
a subsystem selected from a group comprising a broadband subsystem with a hardwire interface and a WLAN subsystem, selected from a group comprising Bluetooth, IEEE 802.11, IEEE 802.15, and WiFi, with an wireless interface; and,
wherein the service module uses the subsystem to access the management server via a network selected from a group comprising a Broadband and a WLAN network, respectively.

23. The UT of claim 13, wherein the UT-specific management instructions comprise instructions to control permitted call zones based on proximity to a location.

24. The UT of claim 13, wherein the UT-specific management instructions comprise instructions to control permitted data services based on a time of day or a location.

25. The UT of claim 13, wherein the UT-specific management instructions comprise instructions to control permitted originated email addresses and permitted target email addresses based on a time of day or a location.

26. The UT of claim 13, wherein the UT-specific management instructions comprise instructions to control permitted call times.

27. A network device for managing cellular telephone network user terminal (UT) services, the network device comprising:
a management server having an Internet Protocol (IP) network interface operatively connected to a cellular subsystem of a UT via a cellular telephone network to register the UT with the cellular telephone network;
supply to the UT, via a traffic channel, a proprietary data message, wherein the message contains UT-specific management instructions for cellular network services, wherein the UT-specific management instructions include instructions to control user account credits, instructions to control permitted call zones and call durations associated with the permitted call zones, instructions to control permitted target call numbers and originating call numbers, instructions to control UT's ring mode and ring options, instructions to control UT's screen options, instructions to control permitted network addresses, instructions to control permitted originating and target email addresses, instructions to control permitted data services, and instructions to control permitted memory saves; and
provide to the UT UT-specific cellular network services requested by the UT.

28. The network device of claim 27, wherein the UT-specific management instructions comprise instructions to control permitted call zones based on proximity to a location.

29. The network device of claim 27, wherein the UT-specific management instructions comprise instructions to control permitted data services based on a time of day or a location.

30. The network device of claim 27, wherein the UT-specific management instructions comprise instructions to control permitted originated email addresses and permitted target email addresses based on a time of day or a location.

31. The network device of claim 27, wherein the UT-specific management instructions comprise instructions to control permitted call times.

32. A non-transitory computer-readable medium stored in a memory and executable for managing cellular telephone network user terminal (UT) services, comprising:
at least one instruction operable to cause a computer to register a UT in a cellular telephone network;
at least one instruction operable to cause the computer to receive, via a traffic channel, a proprietary data message from the cellular telephone network, wherein the proprietary data message contains UT-specific management instructions for cellular network services, and wherein the UT-specific management instructions include instructions; to control user account credits, instructions to control permitted call zones and call durations associated with the permitted call zones, instructions to control permitted target call numbers and originating call numbers, instructions to control UT's ring mode and ring options, instructions to control UT's screen options, instructions to control permitted network addresses, instructions to control permitted originating and target email addresses, instructions to control permitted data services, and instructions to control permitted memory saves; and
at least one instruction operable to cause the computer to request cellular network services for the UT in response to the UT-specific management instructions.

33. The non-transitory computer-readable medium of claim 32, wherein the UT- specific management instructions comprise instructions to control permitted call zones based on proximity to a location.

34. The non-transitory computer-readable medium of claim 32, wherein the UT-specific management instructions comprise instructions to control permitted data services based on a time of day or a location.

35. A user terminal (UT) with managed cellular telephone network services, the UT comprising:
means for registering a UT in a cellular telephone network;
means for receiving, via a traffic channel, a proprietary data message from the cellular telephone network, wherein the proprietary data message contains UT-specific management instructions for cellular network services, wherein the UT-specific management instructions include instructions to control user account credits, instructions to control permitted call zones and call durations associated with the permitted call zones, instructions to control permitted target call numbers and originating call numbers, instructions to control UT's ring mode and ring options, instructions to control UT's screen options, instructions to control permitted network addresses, instructions to control permitted originating and target email addresses, instructions to control permitted data services, and instructions to control permitted memory saves; and means for requesting cellular network services for the UT in response to the UT-specific management instructions.

36. The UT of claim 35, wherein the UT-specific management instructions comprise instructions to control permitted call zones based proximity to a location.

37. The UT of claim 35, wherein the UT-specific management instructions comprise instructions to control permitted data services, based on a time of day or a location.

* * * * *